US012391067B2

(12) United States Patent
Peters et al.

(10) Patent No.: US 12,391,067 B2
(45) **Date of Patent: *Aug. 19, 2025**

(54) APPARATUS, SYSTEM, AND METHOD OF PROVIDING A STABILIZING DRIVE SYSTEM FOR A ROBOTIC VEHICLE

(71) Applicant: JABIL INC., St. Petersburg, FL (US)

(72) Inventors: Danny Peters, St. Petersburg, FL (US); Jarrett Gayne, St. Petersburg, FL (US)

(73) Assignee: JABIL INC.

( * ) Notice: Subject to any disclaimer, the term of this patent is extended or adjusted under 35 U.S.C. 154(b) by 26 days.

This patent is subject to a terminal disclaimer.

(21) Appl. No.: 18/435,539

(22) Filed: Feb. 7, 2024

(65) Prior Publication Data

US 2024/0246359 A1 Jul. 25, 2024

Related U.S. Application Data

(63) Continuation of application No. 17/044,043, filed as application No. PCT/US2019/025183 on Apr. 1, 2019, now Pat. No. 11,926,172.

(Continued)

(51) Int. Cl.

*B60B 19/14* (2006.01)
*B25J 5/00* (2006.01)

(Continued)

(52) U.S. Cl.

CPC ............... *B60B 19/14* (2013.01); *B25J 5/007* (2013.01); *B25J 9/1664* (2013.01); *B25J 9/1697* (2013.01); *B60B 19/003* (2013.01); *B60B 33/08* (2013.01)

(58) Field of Classification Search

CPC ....... B60B 19/14; B60B 19/003; B60B 33/08; B25J 5/007; B25J 9/1664; B25J 9/1697

See application file for complete search history.

(56) References Cited

U.S. PATENT DOCUMENTS 3,708,140 A 1/1973 Rashis
5,419,008 A * 5/1995 West ........................ B25J 5/005 16/25

(Continued)

FOREIGN PATENT DOCUMENTS

CN 205835419 12/2016
CN 106625618 5/2017

(Continued)

OTHER PUBLICATIONS

Chinese Office Action (including English translation) issued in App. No. CN20198029098, dated Oct. 30, 2023, 17 pages.

(Continued)

*Primary Examiner* — Toan C To

(74) *Attorney, Agent, or Firm* — Riverside Law LLP

(57) ABSTRACT

An apparatus, system and method capable of providing a stabilizing drive system for a robotic vehicle. The apparatus, system and method may include at least a robot body base; at least two drive wheels within the robot body base; a processing system having non-transitory computing code associated therewith which, when executed by the processing system, causes to be driven the at least two drive wheels; and a plurality of ball casters within the robot body base, wherein the ball caster are positioned relative to the robot base and to the at least two drive wheels so as to lower a center of gravity of the robot and provide stabilization of the driving.

19 Claims, 7 Drawing Sheets

106
120b
122
120a
306
128
120b
122
120a

Related U.S. Application Data

(60) Provisional application No. 62/650,852, filed on Mar. 30, 2018.

(51) Int. Cl.

*B25J 9/16* (2006.01)
*B60B 19/00* (2006.01)
*B60B 33/08* (2006.01)

(56) References Cited

U.S. PATENT DOCUMENTS

| | | | |
|---|---|---|---|
| 6,095,268 A | | 8/2000 | Jones, Jr. |
| 6,134,747 A | | 10/2000 | Leibman |
| 7,912,574 B2 | | 3/2011 | Wurman |
| 8,649,899 B2 | | 2/2014 | Wurman |
| 9,323,250 B2 | | 4/2016 | Wang |
| 9,427,649 B2 * | | 8/2016 | Teevens ................. A63B 69/34 |
| 9,796,213 B1 | | 10/2017 | Menard |
| 10,968,966 B2 | | 4/2021 | Carbone |
| 11,001,298 B2 | | 5/2021 | Geiger |
| 11,040,746 B2 * | | 6/2021 | Waita .................... B60B 19/003 |
| 11,926,172 B2 * | | 3/2024 | Peters ..................... B60B 33/08 |
| 12,048,655 B2 * | | 7/2024 | Bleakney ................. B62H 1/06 |
| 2003/0155747 A1 | | 8/2003 | Bridges |
| 2004/0010337 A1 | | 1/2004 | Mountz |
| 2004/0093116 A1 | | 5/2004 | Mountz |
| 2016/0334801 A1 | | 11/2016 | Ratanaphanyarat |
| 2017/0065354 A1 | | 3/2017 | Shiels |
| 2018/0250178 A1 | | 9/2018 | Paul |
| 2018/0370582 A1 | | 12/2018 | Sato |
| 2020/0017297 A1 | | 1/2020 | Mohan |
| 2020/0172184 A1 | | 6/2020 | Abdellatif |
| 2021/0072763 A1 | | 3/2021 | Chen |
| 2022/0176736 A1 | | 6/2022 | Abdellatif |

FOREIGN PATENT DOCUMENTS

| | | |
|---|---|---|
| CN | 107472397 | 12/2017 |
| JP | 2004034924 | 2/2004 |
| JP | 2017000194 | 1/2017 |
| KR | 20040096252 | 11/2004 |
| KR | 20180020755 | 2/2018 |
| WO | 2015025173 | 2/2015 |

OTHER PUBLICATIONS

Communication pursuant to Article 94(3) EPC issued in U.S. Appl. No. 19/775,109, dated Nov. 29, 2023, 5 pages.

Office Action (Notice of Allowance and Fees Due (PTOL-85)) dated Jan. 8, 2024 for U.S. Appl. No. 17/044,043 (pp. 1-4).

Office Action (Notice of Allowance and Fees Due (PTOL-85)) dated Nov. 9, 2023 for U.S. Appl. No. 17/044,043 (pp. 1-7).

Office Action (Notice of Allowance and Fees Due (PTOL-85)) dated Nov. 15, 2023 for U.S. Appl. No. 17/044,043 (pp. 1-2).

* cited by examiner

APPARATUS, SYSTEM, AND METHOD OF PROVIDING A STABILIZING DRIVE SYSTEM FOR A ROBOTIC VEHICLE

CROSS-REFERENCE TO RELATED APPLICATION

This application is a Continuation of U.S. patent application Ser. No. 17/044,043, filed Sep. 30, 2020, entitled: APPARATUS, SYSTEM, AND METHOD OF PROVIDING A STABILIZING DRIVE SYSTEM FOR A ROBOTIC VEHICLE, which is a national stage application of International Patent Application No. PCT/US2019/025183, filed April 1,2019, entitled: APPARATUS, SYSTEM, AND METHOD OF PROVIDING A STABILIZING DRIVE SYSTEM FOR A ROBOTIC VEHICLE, which claims the benefit to U.S. Provisional Application No. 62/650,852, filed Mar. 30, 2018, entitled APPARATUS, SYSTEM, AND METHOD OF PROVIDING A STABILIZING DRIVE SYSTEM FOR A ROBOTIC VEHICLE, each of which are incorporated herein by reference it their entireties.

BACKGROUND

Field of the Disclosure

The disclosure relates generally to robotics, and, more particularly, to an apparatus, system, and method of providing a stabilizing drive system for a robotic vehicle.

Background of the Disclosure

Autonomous mobile robots are becoming progressively more commonplace in a variety of settings. For example, autonomous mobile robots are used in security settings, such as for patrols; retail environments, such as for purchase tracking and shopping monitoring; warehousing environments, such as for restocking and other alerts; and hazardous environments, such as to track for safe conditions. As such, autonomous mobile robotics may encounter a variety of conditions and obstacles, both static and dynamic, and may serve a variety of purposes.

Several of the foregoing and other alternative environments in which autonomous mobile robotics typically operate may necessitate variations in the size of the mobile robot. For example, it may be advantageous in some operational settings for a robot to be tall, such as so that the robot can "see" at a greater distance, better sense obstacles, or otherwise better perform its stated function, such as in a security patrol setting. However, it is typically the case that robots are autonomously driven by a set of drive wheels and a principally onboard navigation system, and consequently the taller the robot is, the easier it is to tip the robot over and thereby cause the robot to stop performing its function. Tipping may occur by a person affirmatively tipping the robot, the robot striking an obstacle that is sufficiently high off the floor level to hit on the robot's body, thereby causing the robot to tip, or by the robot "tripping" over an object at or near floor level that causes the robot to tip over.

SUMMARY OF THE DISCLOSURE

The disclosure is and includes at least an apparatus, system and method capable of providing a stabilizing drive system for a robotic vehicle. The apparatus, system and method may include at least a robot body base; at least two drive wheels within the robot body base; a processing system having non-transitory computing code associated therewith which, when executed by the processing system, causes to be driven the at least two drive wheels; and a plurality of ball casters within the robot body base, wherein the ball caster are positioned relative to the robot base and to the at least two drive wheels so as to lower a center of gravity of the robot and provide stabilization of the driving.

BRIEF DESCRIPTION OF THE DRAWINGS

The disclosure is illustrated by way of example and not limitation in the accompanying drawings, in which like references indicate similar elements, and in which.

DETAILED DESCRIPTION

Figure 1:
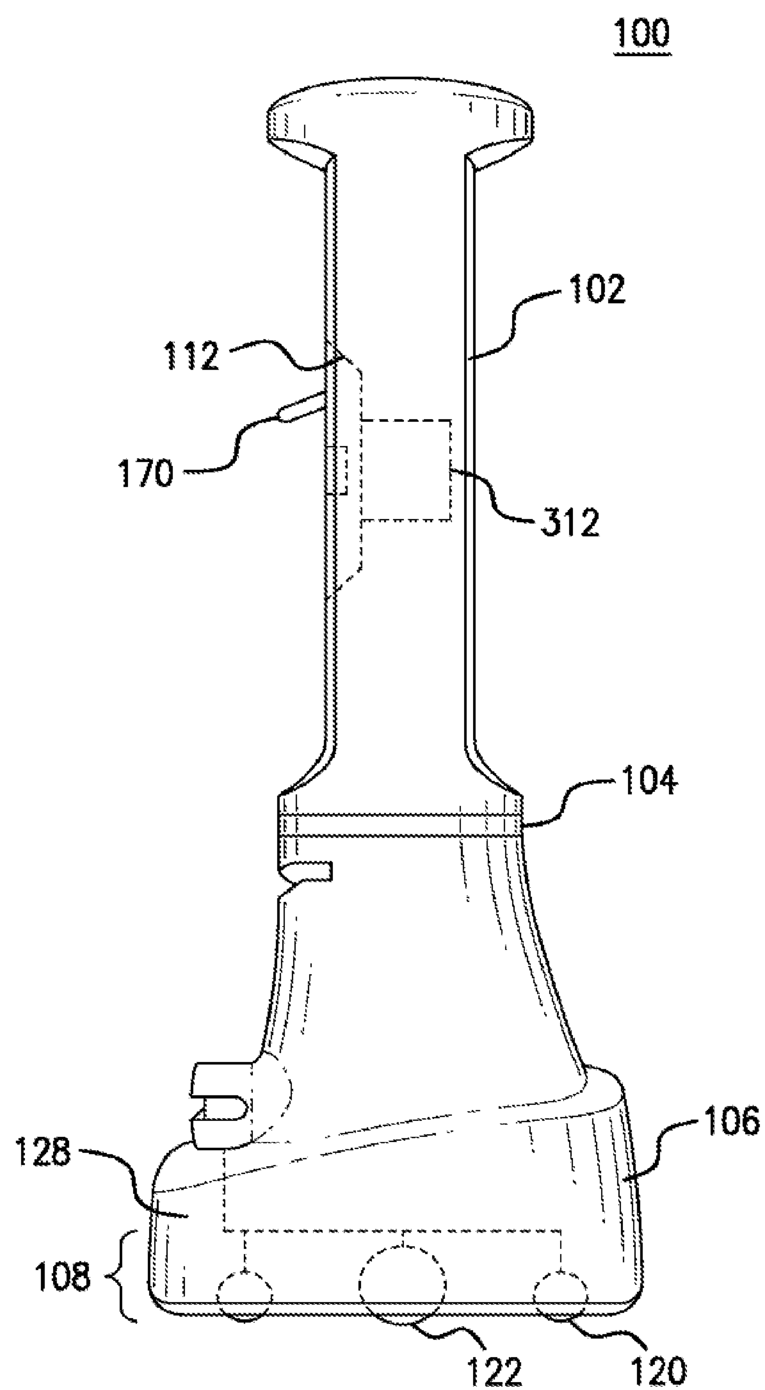
FIG. 1 illustrates an exemplary robotic device.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

The embodiments include at least an improved drive mechanism for an autonomous mobile robot. The improved drive system improves the ability of the robot to overcome and/or avoid obstacles that might otherwise cause the robot to tip over. This may be accomplished by a number of aspects provided in the embodiments, including improving the center of gravity of even a tall mobile robot by lowering the center of gravity, and providing stabilizing, substantially cornered caster ball wheels, in addition to the drive train wheels typically provided in most mobile robots.

More particularly, the provided embodiments, in part through the provision of the aforementioned additional corner casters, may lower the center of gravity of a tall robot by adding distributed weight about the base of the robot, thereby providing a more stable base upon which the mobile robot operates. Further, at least four ball casters may be provided, such as one ball caster proximate to each corner of a rectangular robot base, in addition to the at least two drive wheels that drive the robot. Drive wheels may operate through the use of dual simultaneous forward rotation to move the robot forward, dual simultaneous reverse operation to move the robot backwards, and staggered rotational operation to turn the robot left and right, as will be understood to the skilled artisan.

Of note, the placement of the ball casters within the base proximate to the corners of the mobile robot does not necessitate that any extra space be devoted to the casters, contrary to the added stabilizing wheels in the known art, which are placed external to the base, thereby increasing the robot's footprint. In operation, the ball caster corners may allow for the robot to scoot in a forward, backward, left, right, or corner direction in order to avoid tip over, even if either or both of the drive wheels lose traction. Further, the presence of ball casters at the corners allows for rotation of the base of the robot about any one or more of the corner ball casters, consequently making the base more stable than in the known art.

For example, the aforementioned stability may allow a tall robot's upper stalk to tip by up to 45°, with only one ball caster still in contact with the floor, without tipping over. By way of further example, the presence of the ball casters may prevent tipping of a mobile robot having the disclosed corner ball casters, as long as two of the ball casters are present in contact with floor level, even if the upper portion of the robot is tipped by 60° or more.

Yet further, the chances that an undetected obstacle on the floor would tip the robot are appreciably decreased in the embodiments. This is the case at least because the casters provide additional degrees of freedom for the robot to rise and fall over obstacles without tipping, and allows for the robot to scoot over or angularly slide (such as wherein a corner is lifted) around obstacles at or near floor level.

It may be noted that, in some embodiments, the casters may be in different positions within the base based on where the casters are in relation to the typical forward and reverse motion of the robot. By way of example, casters at the "rear" of the robot may be farther towards the outer perimeter of the base of the robot than are the casters associated with the "front" of the robot. This may be the case because casters in the front of the robot may need to move inwardly along the base to account for the outward extension of a bumper or similar safety mechanism from the base of the robot at the front portion thereof. In any case, ball casters may be placed as close to the corners of the base of the robot as is possible in order to maximize stability of the drive system of the robot.

FIG. 1 illustrates an exemplary robot 100 in accordance with the embodiments. The illustrated robot 100 has a tall robot stalk 102 associated with a robot midsection 104, and a robot base 106 having therewithin a drive system 108 to move the robot 100 at least in the forward or reverse directions. Of course, it will be appreciated that the drive system 108 may also move the robot in both forward and reverse, and/or may move the robot left and/or right, without departing from this disclosure.

Associated with the stalk 102 of the robot, and/or the midsection 104 of the robot, may be one or more drive assistance systems 112, such as may include one or more sensors, cameras, or the like 170, which provide data that allows for the robot 100 to navigate autonomously. Further associated with the stalk 102 and/or the midsection 104 of the robot 100 may be one or more processing systems 312 that may, as part of the drive assistance system 112 and in conjunction with the referenced sensing systems 170, navigate or otherwise safely operate the robot 100 based on one or more operational algorithms. These one or more processing systems 312 may be fully on board the robot 100, may perform shared processing with processing systems off-board the robot, such as via wireless communication between the robot processing system 312 and the off board processing system, or may be fully off board the robot, as is discussed further hereinbelow.

As referenced, the robot base 106 may include at least one drive system 108 for the robot 100. As part of this drive system 108, the illustrated robot base 106 includes corner casters 120 proximate to the four corners of the substantially rectangular robot base 106, and two drive wheels 122, one on the left side and one on the right side of the forward motion axis of the robot. It will be understood that additional casters may be included beyond the four corner casters 120 illustrated in FIG. 1, and the number of casters may be dependent upon the shape of the robot base. Moreover, it will be understood that more than two drive wheels 122 may be associated with the robot, such as in embodiments having two wheels to drive forward and reverse, and two or more turning wheels suitable to provide an improved turning radius to the robot.

It will be appreciated that the drive wheels 122 will typically be affirmatively mechanically rotated, such as at the command of processing system 312. So, too, may be the ball casters 120 or similar stabilizing wheels or casters in accordance with the embodiments, although, in typical embodiments, the ball casters 120 may be passive, i.e., solely reactive, in nature.

Also evident in FIG. 1 is a bumper mechanism 128 at the "front" of the robot base 106. This bumper 128 may improve the safety of operation of the robot 100 in the forward direction, such as by limiting damage to the robot in the event an obstacle is encountered for both static and dynamic obstacles. However, it will be understood that a robot 100 in accordance with the disclosure needn't include such a bumper 128.

Figure 2:
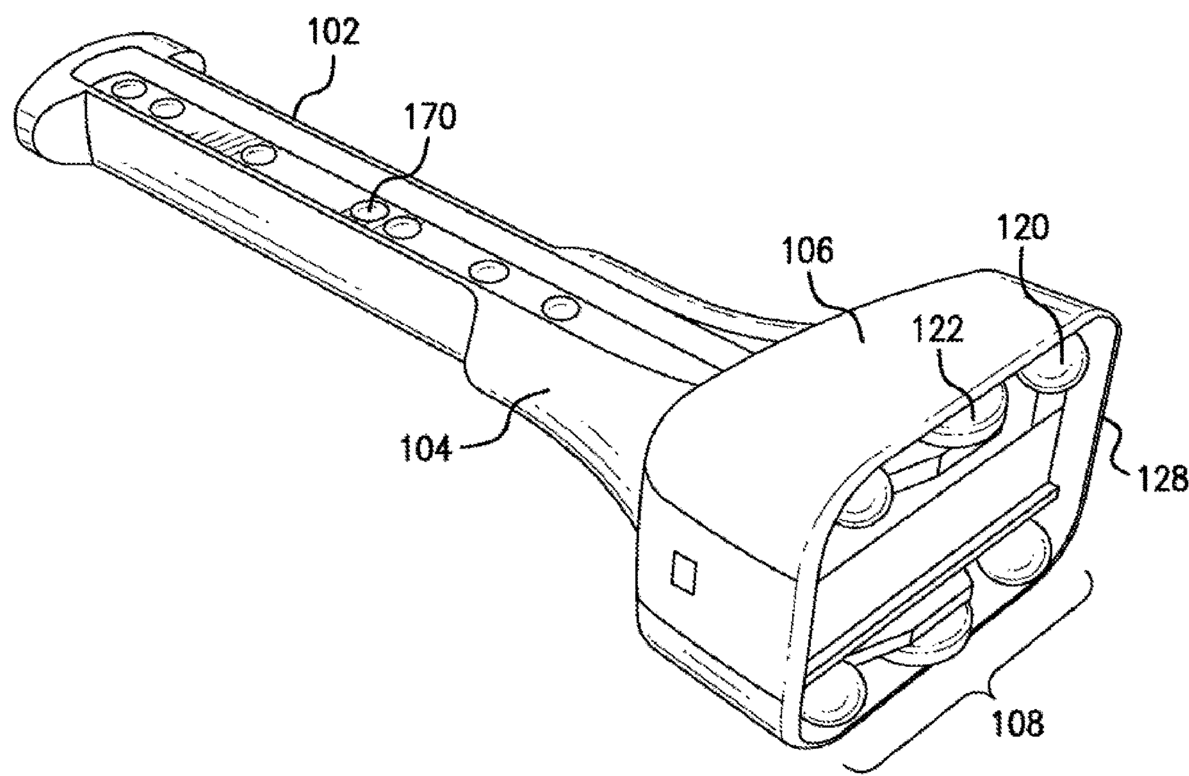
FIG. 2 illustrates an exemplary robotic device.

FIG. 2 illustrates a bottom view from beneath the base 106, i.e., the base 106 is viewed upwardly from the floor surface on which the robot operates, for the robot 100 illustrated in FIG. 1. As is evident in FIG. 2, the rectangular base 106 (shown by way of example) has four ball casters 120 associated with the base 106 substantially at the corners thereof, and has two drive wheels 122 proximate to the left and right sides of forward direction for the robot 100. As shown, the drive system 108 may have one or more electrical, mechanical, and/or electromechanical elements associated therewith to allow for affirmative actuation of at least the drive wheels 122 for the robot 100 provided within the base 106.

Figure 3:
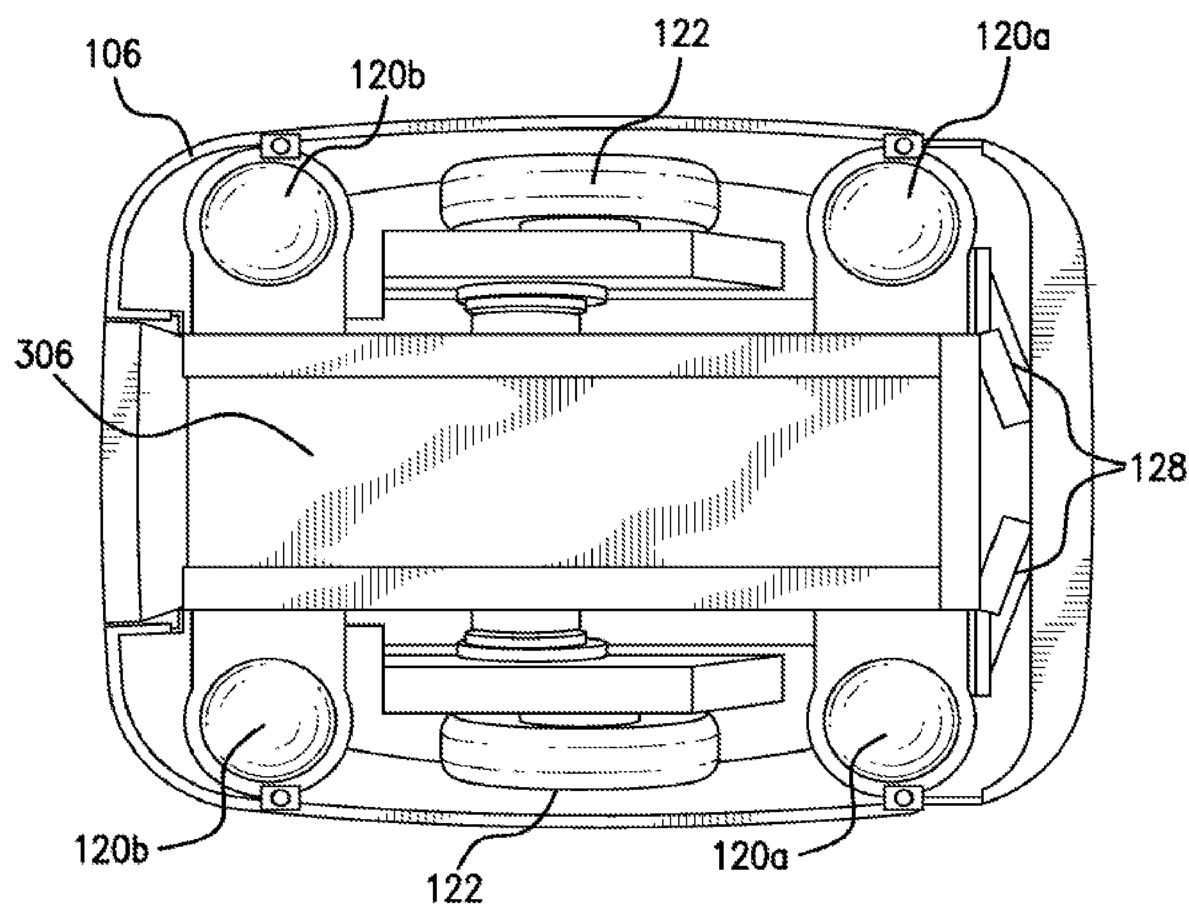
FIG. 3 illustrates an exemplary robotic device.

The embodiments are further illustrated with respect to the exemplary embodiment of FIG. 3. The illustrated embodiment again shows the association of four ball casters 120 proximate to the corners of the rectangular base 106 of the robot 100, and two drive wheels 122 having associated mechanicals and electricals connected thereto suitable to drive the robot 100.

As is again apparent in the illustration of FIG. 3, the "front" ball casters 120*a* may be more substantially inset from the front of the base 106 than are the rear ball casters 120*b* from the rear of the base 106, such as to accommodate a safety bumper mechanism 128 with the front of the robot base 106. Also evident is one or more frames 202 in which the ball casters 120 may ride, and such frames 202 may allow not only for rotation of the ball casters 120 therewithin, but may also allow for an upward and downward movement of the ball casters 120 in the Z axis direction within each respective frame 202. In embodiments wherein the ball casters 120 may move upward and downward, it will be understood that a suspension system 302 may be provided in association with the frame(s) 202, such as in the way of "shock absorbers", such that the ball casters 120 may move more readily in the Z axis.

Figure 4:
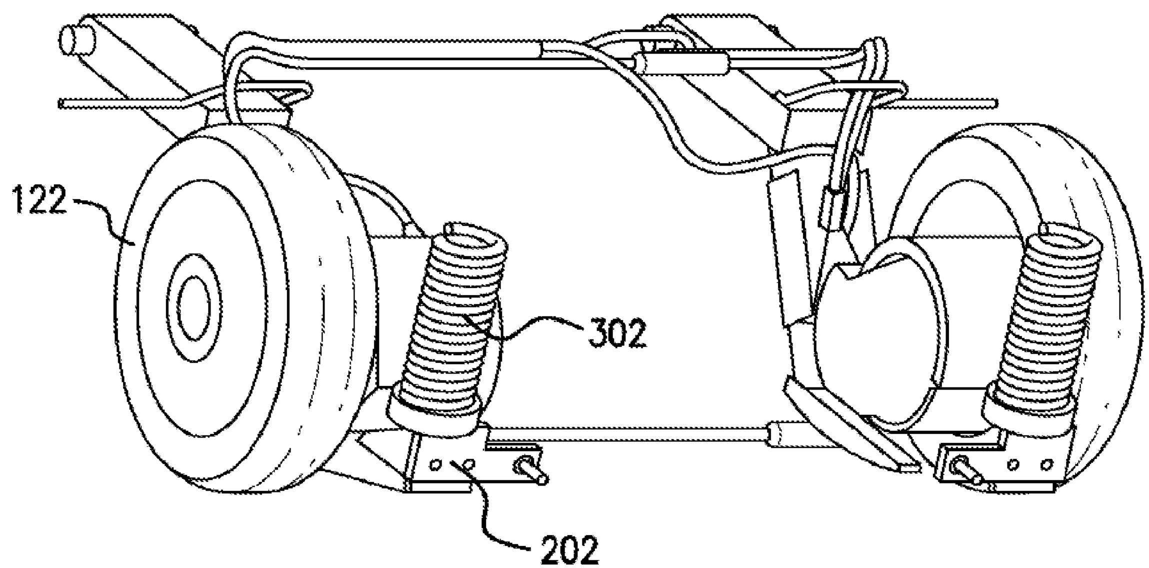
FIG. 4 illustrates an exemplary robotic device drive system.

FIG. 4 illustrates an exemplary suspension system 302 suitable to hold therein one or more frames 202 into which the disclosed ball casters 120 may be placed. As shown, the suspension system 302 that allows for movement of the ball casters 120 in the Z axis may be spring-based, although it will be understood that other suspension system types, such as hydraulic- or pneumatic-based suspension systems, may be employed without departing from the disclosure.

Further and as illustrated, the suspension system 302 provided for each ball caster 120 and associated frame 202 may operate independently from other suspension systems, or may be operationally associated with the suspension systems of other ball casters. Such an operational association may include, by way of non-limiting example, a distribution of the ball caster frames 202 across a unitary underbody frame 306 at the lowermost portion of the robot's underside. Of course, this unitary underbody frame 306 may perform other functions, such as protecting the underside of the robot from damage, particulate, moisture, and so on.

Figure 5:
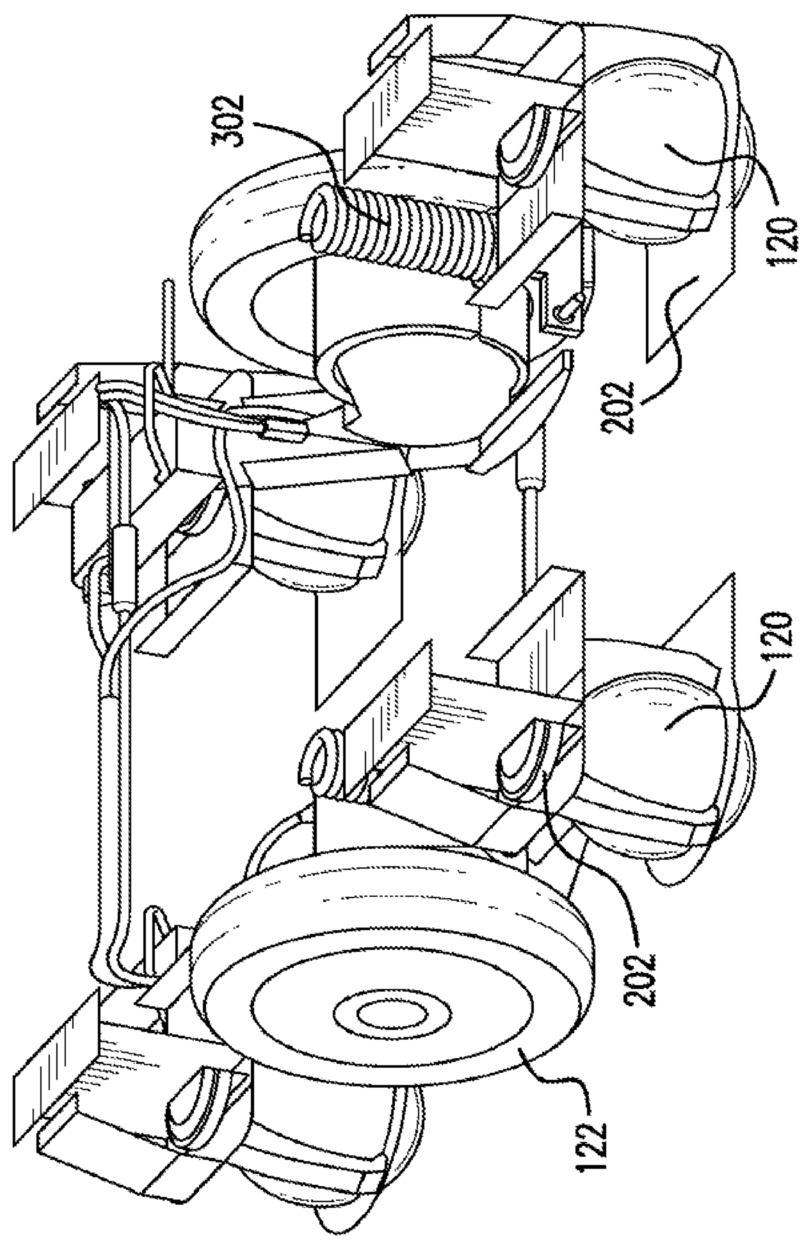
FIG. 5 illustrates an exemplary robotic device drive system.

FIG. 5 illustrates the exemplary association of one or more ball casters 120 with ball caster frames 202 that respectively may or may not ride within a unitary base frame 306. Ones of the ball caster frames 202 may have associated therewith a suspension system 302. By way of example, only the "front" ball casters 120 may have Z-axis suspension system 302 associated therewith, although it will be understood that the "rear" wheels may additionally have a suspension associated therewith.

Figure 6:
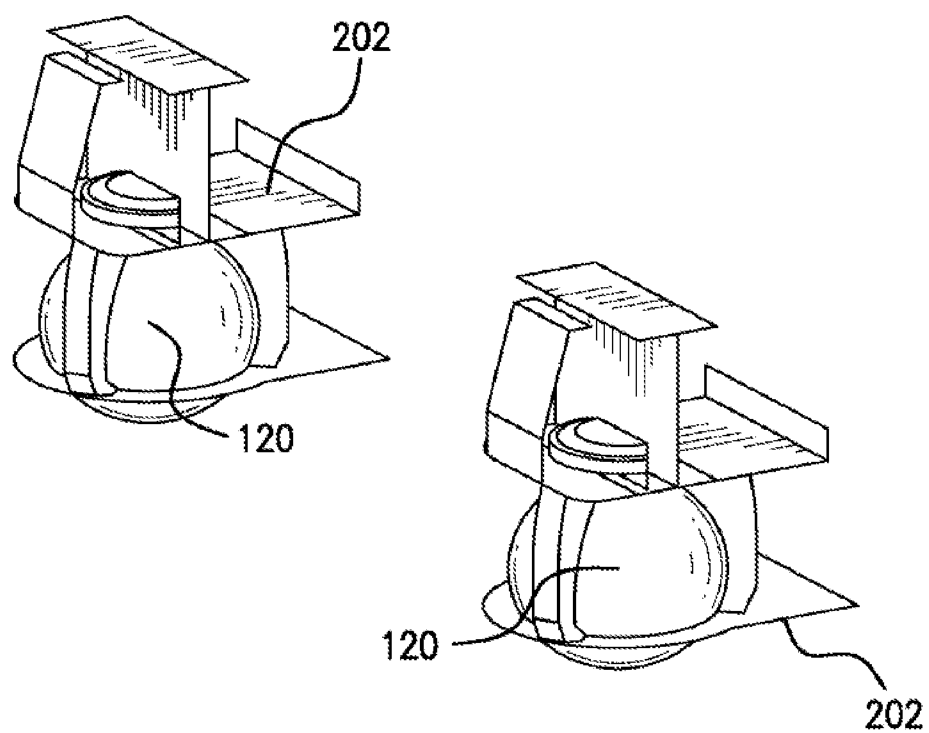
FIG. 6 illustrates an exemplary ball caster and ball caster frame.

FIG. 6 illustrates a ball caster 120, in accordance with the embodiments, within a ball caster frame 202 that allows for multidirectional operation of the ball caster 120. As illustrated, the ball caster 120 may reside within an enclosed or partially enclosed frame 202. The frame 202 may have a sufficiently low coefficient of friction so as to allow free rotation of the ball caster 120 therewithin. Of course, it will be understood that any of numerous mechanisms to allow for free rotation of the ball caster 120 within the frame 202 may be provided by the frame 202 without departing from the disclosure, such as the use of ball bearings within the frame 202, by way of non-limiting example.

Figure 7:
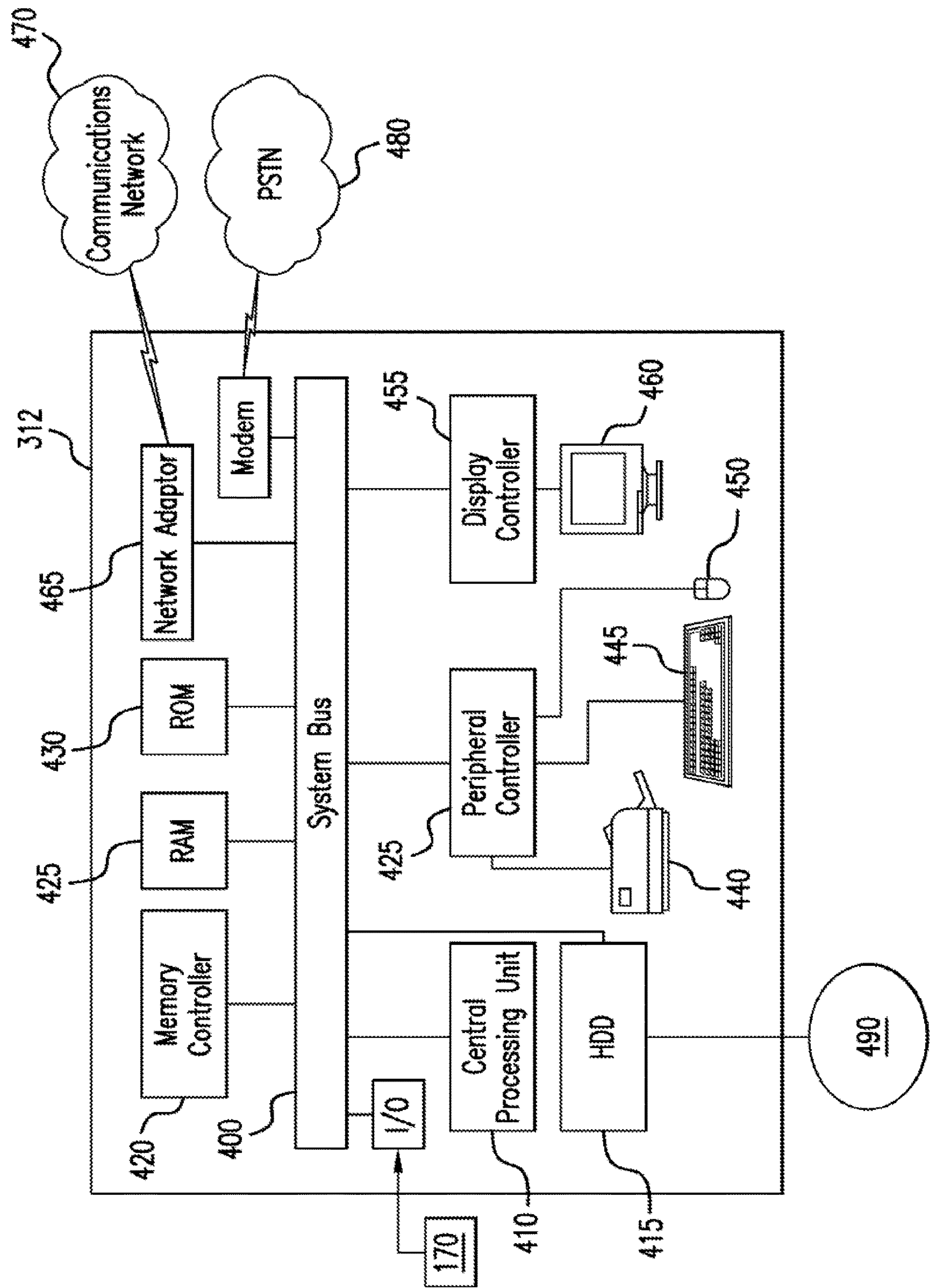
FIG. 7 illustrates a processing system for use with a mobile robotic device.

FIG. 7 depicts an exemplary computer processing system 312 for use in association with the embodiments, by way of non-limiting example. Processing system 312 is capable of executing software, such as an operating system (OS) and one or more computing algorithms/applications 490, such as those for the processing of inputs received from sensors 170. The operation of exemplary processing system 312 is controlled primarily by these computer readable instructions/code 490, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause system 312 to perform the disclosed operations, comparisons and navigation calculations. In many known computer servers, workstations, personal computers, and the like, CPU 410 is implemented in an integrated circuit called a processor.

It is appreciated that, although exemplary processing system 312 is shown to comprise a single CPU 410, such description is merely illustrative, as processing system 312 may comprise a plurality of CPUs 410. Additionally, system 312 may exploit the resources of remote CPUs (not shown) through communications network 470 or some other data communications means 480, as discussed above.

In operation, CPU 410 fetches, decodes, and executes instructions from a computer readable storage medium such as HDD 415. Such instructions may be included in software such as an operating system (OS), executable programs/applications 490, and the like. Information, such as computer instructions and other computer readable data, is transferred between components of system 312 via the system's main data-transfer path. The main data-transfer path may use a system bus architecture 405, although other computer architectures (not shown) can be used.

Memory devices coupled to system bus 405 may include random access memory (RAM) 425 and/or read only memory (ROM) 430, by way of example. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420.

In addition, processing system 312 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus that is well known in the pertinent art.

Display 460, which is controlled by display controller 455, may be used to display visual output and/or presentation data generated by or at the request of processing system 312, responsive to operation of the aforementioned computing programs/applications 490. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, processing system 312 may contain network adapter 465 which may be used to couple to external communication network 470, which may include or provide access to the Internet, an intranet, an extranet, or the like. Communications network 470 may provide access for processing system 312 with means of communicating and transferring software and information electronically. Additionally, communications network 470 may provide for distributed processing, which involves several computers and the sharing of workloads or cooperative efforts in performing a task, as discussed above. Network adaptor 465 may communicate to and from network 470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A drive system for a robot, comprising:

a robot body base including a drive wheel;

a plurality of ball casters within the robot body base, wherein the ball casters are positioned relative to the robot base and to the drive wheel so as to lower a center of gravity of the robot and provide stabilization of the driving; and a plurality of frames mounted within the robot body base for receiving the plurality of ball casters.

2. The drive system of claim 1, wherein the plurality of ball casters comprises four ball casters, and wherein the positioning of the ball casters comprises proximate to corners of the robot body base.

3. The drive system of claim 1, wherein the plurality of frames comprise low coefficients of friction so as to allow free rotation of the plurality of ball casters.

4. The drive system of claim 3, wherein the low coefficients of friction are provided by one of a smooth surface and ball bearings.

5. The drive system of claim 1, further comprising a unitary under-body frame, wherein ones of the plurality of frames are physically associated with the unitary under-body frame.

6. The drive system of claim 1, further comprising one or more suspension systems physically associated with ones of the plurality of frames.

7. The drive system of claim 6, wherein the one or more suspension systems are spring-based.

8. The drive system of claim 6, wherein one or more of the suspension systems are hydraulics-based.

9. The drive system of claim 1, wherein the robot body base further comprises a front bumper, and wherein at least ones of the plurality of ball casters at a front of the robot body base are inset from the front bumper.

10. The drive system of claim 1, wherein the stabilizing comprises a tip by up to 45° without destabilization with at least one of the plurality of ball casters still in contact with a floor surface.

11. The drive system of claim 1, wherein the stabilizing comprises a tip by up to 60° without destabilization with at least two of the plurality of ball casters still in contact with a floor surface.

12. The drive system of claim 1, wherein the driving comprises forward and reverse.

13. The drive system of claim 1, wherein the plurality of ball casters is passively driven.

14. The drive system of claim 1, wherein the plurality of ball casters is actively driven.

15. The drive system of claim 1, further comprising a processing system having non-transitory computing code associated therewith which, when executed by the processing system, causes to be driven the drive wheel, and a plurality of sensors to which the processing system is responsive.

16. The drive system of claim 15, wherein the plurality of sensors comprise at least cameras.

17. The drive system of claim 1, wherein the driving comprises an autonomous navigation.

18. The drive system of claim 15, wherein the processing system is partially off-board the robot.

19. The drive system of claim 1, wherein the drive wheel comprises two forward and reverse drive wheels, and two turning drive wheels.

* * * * *